(12) United States Patent
Suh et al.

(10) Patent No.: US 10,817,704 B2
(45) Date of Patent: Oct. 27, 2020

(54) METHOD AND APPARATUS FOR EXTRACTING FEATURE FROM INPUT IMAGE

(71) Applicant: Samsung Electronics Co., Ltd., Suwon-si, Gyeonggi-do (KR)

(72) Inventors: Sungjoo Suh, Seoul (KR); Seungju Han, Seoul (KR); Jaejoon Han, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 16/234,720

(22) Filed: Dec. 28, 2018

(65) Prior Publication Data

US 2019/0138792 A1 May 9, 2019

Related U.S. Application Data

(62) Division of application No. 14/816,149, filed on Aug. 3, 2015.

(30) Foreign Application Priority Data

Sep. 18, 2014 (KR) .................. 10-2014-0124161

(51) Int. Cl.
*G06K 9/00* (2006.01)
(52) U.S. Cl.
CPC .............................. *G06K 9/00248* (2013.01)
(58) Field of Classification Search
CPC ......... C08L 67/02; C08L 67/04; C08K 3/013; C08K 3/0033; G06K 9/00248; B32B 2250/40; B32B 2264/104; B32B 2307/54; B32B 2307/7163; B32B 2439/70; B32B 27/08; B32B 27/20; B32B 27/36; B32B 27/365; C08J 2367/02; C08J 2367/04; C08J 2467/02; C08J 2467/04; C08J 5/18
See application file for complete search history.

(56) References Cited

U.S. PATENT DOCUMENTS

| 6,144,755 A | 11/2000 | Niyogi et al. |
| 2010/0189358 A1* | 7/2010 | Kaneda ............... G06K 9/00744 |
| | | 382/195 |
| 2012/0288167 A1* | 11/2012 | Sun ..................... G06K 9/00281 |
| | | 382/118 |

FOREIGN PATENT DOCUMENTS

| JP | 2001043374 A | 2/2001 |
| KR | 1020060008814 A | 1/2006 |

(Continued)

OTHER PUBLICATIONS

Multi-PIE face database, Carnegie Mellon University, Pittsburgh, PA., USA (Year: 2000).*

(Continued)

*Primary Examiner* — Manuchehr Rahmjoo
(74) *Attorney, Agent, or Firm* — Harness, Dickey & Pierce, P.L.C.

(57) ABSTRACT

At least one example embodiment discloses a method of extracting a feature from an input image. The method may include detecting landmarks from the input image, detecting physical characteristics between the landmarks based on the landmarks, determining a target area of the input image from which at least one feature is to be extracted and an order of extracting the feature from the target area based on the physical characteristics and extracting the feature based on the determining.

2 Claims, 12 Drawing Sheets

(56) References Cited

FOREIGN PATENT DOCUMENTS

| | | |
|---|---|---|
| KR | 10-2006-0054540 A | 5/2006 |
| KR | 100714724 B1 | 5/2007 |
| KR | 2008-0060007 A | 7/2008 |
| KR | 10-2008-0079798 A | 9/2008 |
| KR | 10-2011-0023407 A | 3/2011 |
| KR | 2012-0050346 A | 5/2012 |
| KR | 101184097 B1 | 9/2012 |
| KR | 10-2013-0002107 A | 1/2013 |
| KR | 10-2013-0064556 A | 6/2013 |

OTHER PUBLICATIONS

Korean Office Action and English translation thereof dated Feb. 20, 2020.

* cited by examiner

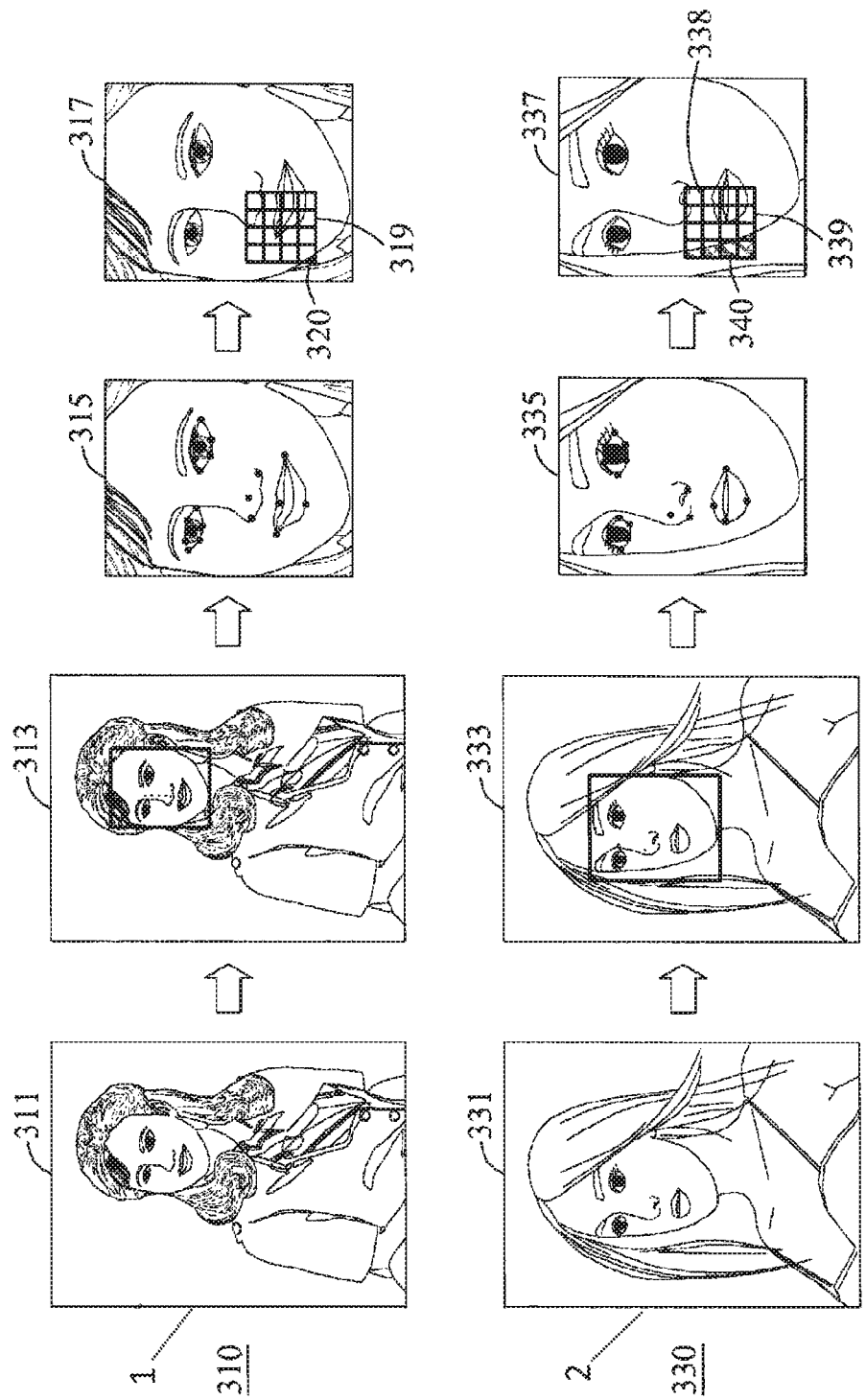

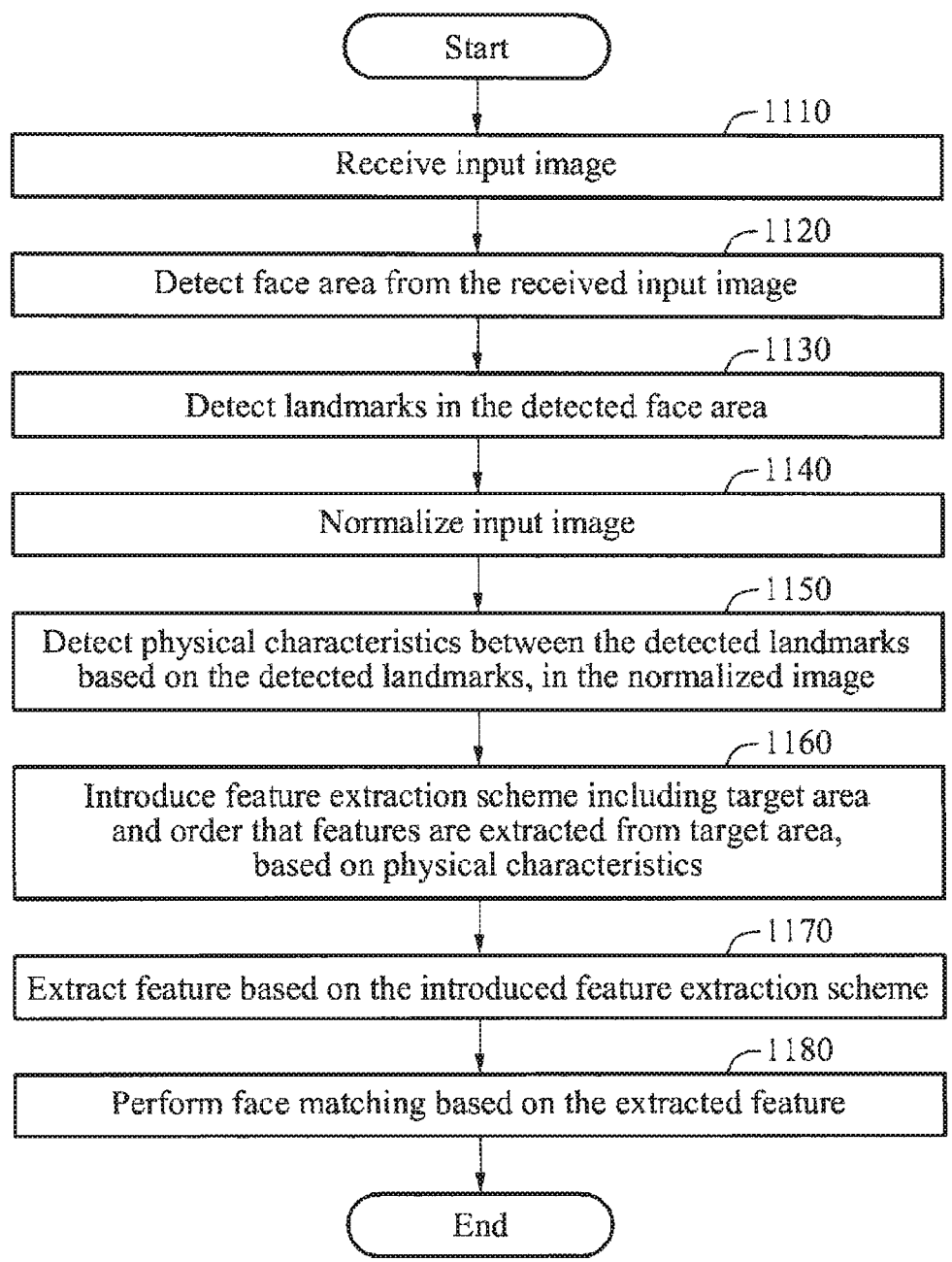

METHOD AND APPARATUS FOR EXTRACTING FEATURE FROM INPUT IMAGE

CROSS-REFERENCE TO RELATED APPLICATIONS

This application is a divisional of U.S. application Ser. No. 14/816,149, filed on Aug. 3, 2015, which claims priority to Korean Patent Application No. 10-2014-0124161, filed on Sep. 18, 2014, in the Korean Intellectual Property Office, the disclosure of each of which is incorporated herein by reference in its entirety.

BACKGROUND

1. Field

At least some example embodiments relate to a method and apparatus that may extract a feature from an input image and that may be robust against a change in a pose.

2. Description of the Related Art

Recently, an importance of security has been increasing in various fields including, for example, banking, security, or technical information protection. Accordingly, an increasing number of security cameras have been installed. In addition, face recognition may be used in permission for access at an entrance or an exit of a building, or user authentication of a personal terminal.

Typically, face recognition may be performed based on a front face of a user. When a change in a pose taken by the user is substantial, for example, when the user faces another direction other than a front side, a normalization process of transforming a face of the user to the front face may be performed. Additionally, when a large distance exists between the user and a camera, a normalization process of transforming a size of a facial image to a size enabling face recognition may be performed. A feature extracted from a facial image transformed through the normalization process may be used to recognize the face of the user.

SUMMARY

At least one example embodiment relates to a method of extracting a feature from an input image.

According to an example embodiment, a method of extracting a feature from an input image may include detecting landmarks from the input image, detecting physical characteristics between the landmarks based on the landmarks, determining a target area of the input image from which at least one feature is to be extracted and an order of extracting the feature from the target area based on the physical characteristics, and extracting the feature based on the determining.

At least some example embodiments provide that the physical characteristics may include an angle between a first landmark determined in advance among the landmarks and each of landmarks other than the first landmark.

At least some example embodiments provide that the input image may be a facial image and the first landmark may be in a central portion of a nose in the facial image.

At least some example embodiments provide that the detecting the physical characteristics may include calculating a first angle between a first landmark and at least one second landmark among the landmarks and a second angle between the first landmark and at least one third landmark among the landmarks.

At least some example embodiments provide that the determining may include determining whether each of the first angle and the second angle is within a set range, and determining a feature extraction scheme based on whether each of the first angle and the second angle is within the set range.

At least some example embodiments provide that the determining the feature extraction scheme may include determining one of a first scheme and a second scheme as the feature extraction scheme for each of locations of the first landmark through the third landmark, based on whether each of the first angle and the second angle is within the set range, the first scheme being used to extract the feature from a first area of the input image in a first order, the second scheme being used to extract the feature from a second area corresponding to the first area in a second order, and the first area including the locations of the first landmark through the third landmark.

At least some example embodiments provide that the determining the feature extraction scheme may include extracting the feature from a plurality of cells included in the first area based on the first scheme if each of the first angle and the second angle is determined to be within the preset and/or selected set range.

At least some example embodiments provide that the determining the feature extraction scheme may include extracting the feature from a plurality of cells included in the second area based on the second scheme if each of the first angle and the second angle is determined to be beyond the set range.

At least one example embodiment relates to a method of extracting a feature from an input image.

According to an example embodiment, a method of extracting at least one feature from an input image may include detecting a face area from the input image, the face area including locations of landmarks, estimating a pose of a user based on angles between the landmarks, determining a target portion of the face area from which the feature is to be extracted and an order of extracting the feature from the target portion based on the estimated pose and extracting the feature from the target portion in the order.

At least some example embodiments provide that the method may further include calculating an angle between the landmarks based on a first landmark of the landmarks.

At least some example embodiments provide that the estimating the pose may include estimating the pose based on whether the calculated angle is within a set range.

At least some example embodiments provide that the estimating the pose may include determining whether each of a first angle between the first landmark and at least one second landmark and a second angle between the first landmark and at least one third landmark among the landmarks is within the set range, and estimating the pose based on whether the first angle and the second angle are within the set range.

At least some example embodiments provide that the estimating the pose may include estimating the pose as a first shape if the calculated angle is within the set range, and that the determining the target portion and the order may include setting a first block in a first portion of the face area if the pose is estimated as the first shape, the first block including a first plurality of cells, and extracting the feature from the first plurality of cells in a first order.

At least some example embodiments provide that the estimating the pose may include estimating the pose as a second shape if the angle is outside the set range, and that the determining the target portion and the order may include setting a second block in a second portion corresponding to the first portion if the pose is estimated as the second shape, the second block including a second plurality of cells, and extracting the feature from the second plurality of cells in a second order.

At least one example embodiment relates to a method of recognizing a face.

According to an example embodiment, a method of recognizing a face may include receiving an input image, detecting a face area from the input image, detecting landmarks in the face area, normalizing the input image, detecting physical characteristics between the landmarks in the normalized input image, determining a target area of the normalized input image from which at least one feature is to be extracted and an order of extracting the feature from the target area based on the physical characteristics; extracting the feature based on the determining, and performing face matching based on the extracted feature.

At least some example embodiments provide that the physical characteristics may include an angle between a first landmark determined first among the landmarks and each of landmarks other than the first landmark.

At least some example embodiments provide that the detecting the physical characteristics may include calculating a first angle between a first landmark and at least one second landmark among the landmarks and a second angle between the first landmark and at least one third landmark among the landmarks.

At least some example embodiments provide that the determining may include determining whether each of the first angle and the second angle is within a set range, and determining a feature extraction scheme based on whether each of the first angle and the second angle is within the set range.

At least some example embodiments provide that the determining the feature extraction scheme may include determining one of a first scheme and a second scheme as the feature extraction scheme for each of locations of the first landmark through the third landmark, based on whether each of the first angle and the second angle is within the set range, the first scheme being used to extract the feature from an area of the input image in a first order, and the second scheme being used to extract the feature from an area corresponding to the area.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 3 illustrates a difference between feature extraction areas based on a pose of a user according to at least some example embodiments;

FIG. 11 is a flowchart illustrating a face recognition method according to at least one example embodiment.

DETAILED DESCRIPTION

Figure 1:
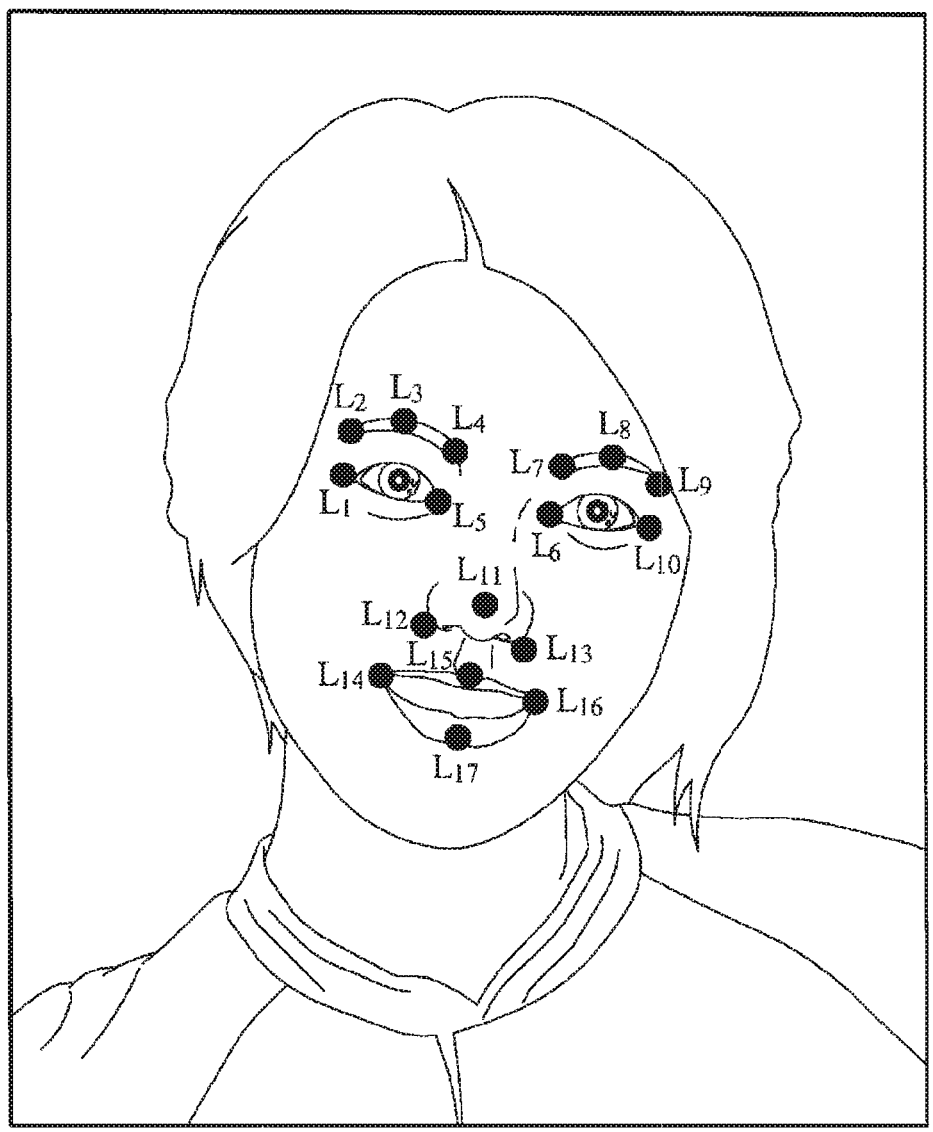
FIG. 1 illustrates landmarks displayed on an image according to at least one example embodiment.

Hereinafter, example embodiments will be further described with reference to the accompanying drawings. Like reference numerals in the drawings refer to like elements.

Various alterations and modifications may be made to the exemplary embodiments. However, it should be understood that these embodiments are not construed as limited to the illustrated forms and include all changes, equivalents or alternatives within the idea and the technical scope of this disclosure.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The same component or components corresponding to each other will be provided with the same reference numeral, and their detailed explanation will be omitted. When it is determined detailed description related to a related known function or configuration which may make the purpose of example embodiments unnecessarily ambiguous in describing example embodiments, the detailed description will be omitted here.

FIG. 1 is a diagram illustrating landmarks displayed on an image according to at least one example embodiment.

Referring to FIG. 1, landmarks L1 to L17 may be detected from a facial image.

A landmark may refer to a main point of a face, to recognize a feature from a facial image. For example, both ends of an eye, lips, a nose, or eyebrows may be landmarks. In an embodiment, "detecting landmarks" may be understood to refer to searching for an estimated location of each of landmarks in an image.

For example, the landmarks L1, L5, L6, and L10 may be detected from corners of both eyes, or the landmarks L2, L3, L4, L7, L8, and L9 may be detected from eyebrows. Additionally, the landmarks L11, L12, and L13 may be detected from a nose portion, and the landmarks L14, L15, L16, and L17 may be detected from a mouth portion.

Figure 2A:
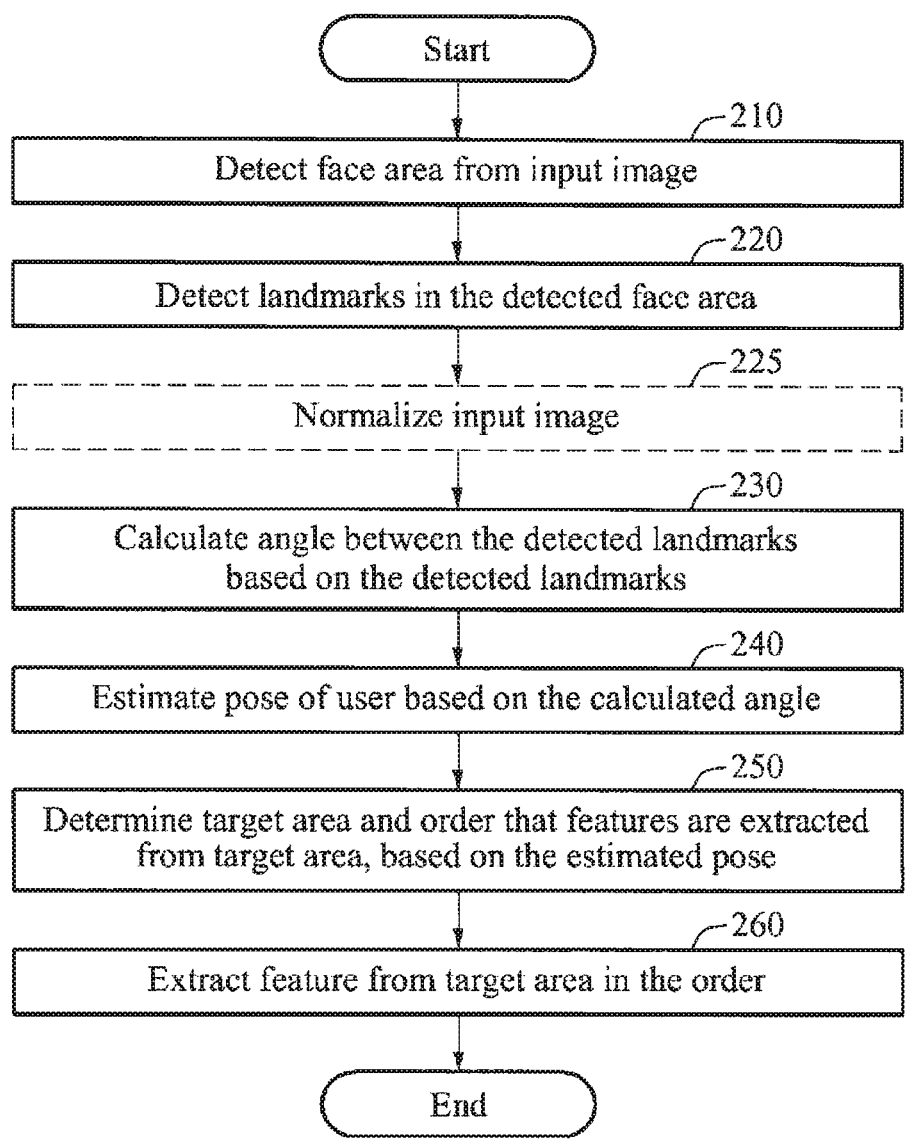
FIGS. 2A and 2B are flowcharts illustrating examples of a method of extracting a feature from an input image according to at least one example embodiment.
Figure 2B:
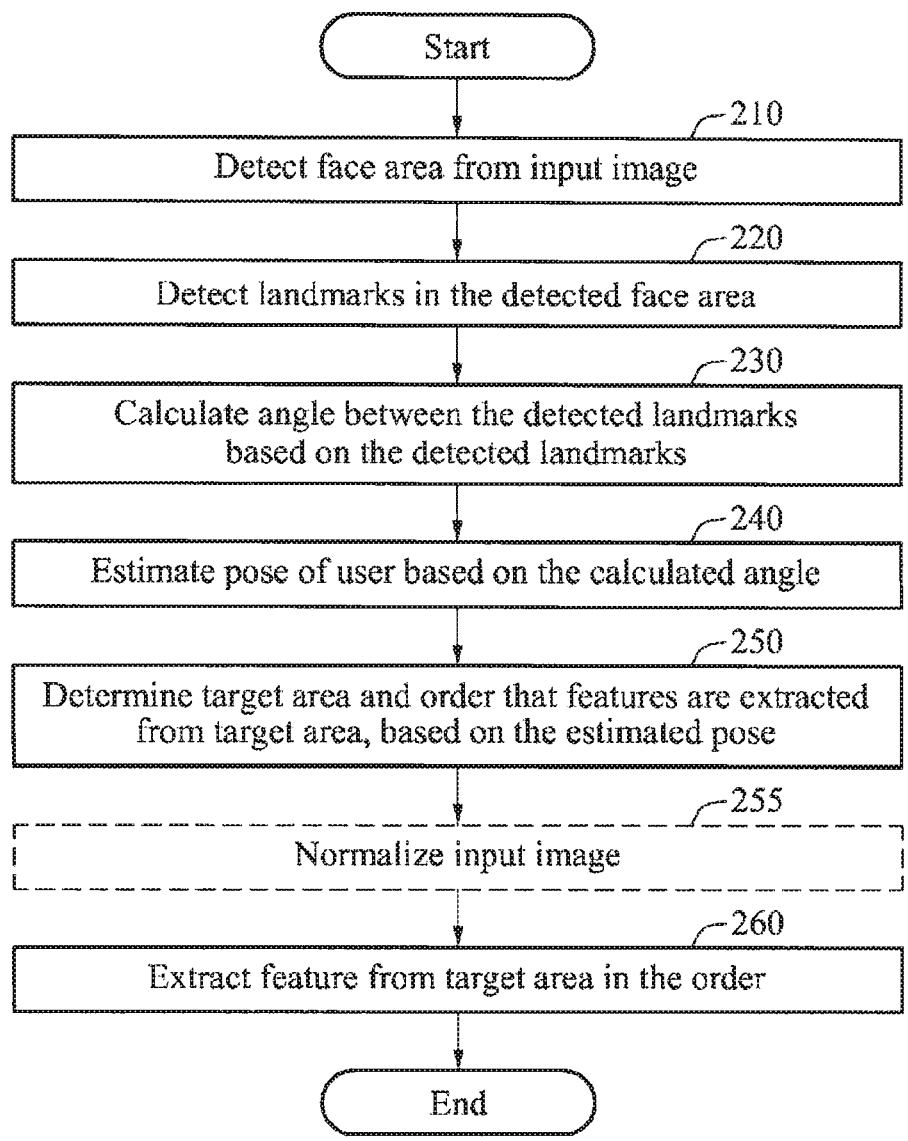

FIGS. 2A and 2B illustrate examples of a method of extracting a feature from an input image according to at least one example embodiment.

Referring to FIG. 2A, an apparatus for extracting a feature from an input image (hereinafter, referred to as an extraction apparatus) may detect a face area from the input image in operation 210, and may detect landmarks in the detected face area in operation 220. In operation 225, the extraction apparatus may normalize the input image. When a size of the input image is small, or when most of a face area of the input image represents a front face, operation 225 may be omitted. The above normalization process may not necessarily be performed, that is, may be performed or omitted depending on a need. Accordingly, operation 225 is represented by a dashed line box in FIG. 2A. In the present disclosure, an example in which normalization is performed is described, however, there is no limitation thereto. Additionally, an example in which normalization is not performed may not be excluded.

In operation 230, the extraction apparatus may calculate angles between the landmarks. For example, the extraction apparatus may calculate angles between the landmarks, based on a first landmark determined in advance in the detected face area.

In operation 240, the extraction apparatus may estimate a pose of a user, based on the angles calculated in operation 230. The extraction apparatus may estimate the pose based on whether each of the calculated angles is within a preset and/or selected range.

For example, the extraction apparatus may determine whether each of an angle between a first landmark and at least one second landmark and an angle between the first landmark and at least one third landmark among the landmarks is within the preset and/or selected range. In this example, the first landmark may be located in a central portion of a nose in the facial image. Additionally, the second landmark and the third landmark may be located in a pupil and a mouth corner, respectively. The extraction apparatus may estimate a pose of a user, based on a determination result.

When each of the angles calculated in operation 230 is determined to be within the preset and/or selected range, the extraction apparatus may estimate the pose as a first shape. The first shape may correspond to a slight change in the pose. An example of the slight change in the pose will be further described with reference to FIG. 4.

When each of the angles calculated in operation 230 is determined to be beyond the preset and/or selected range, the extraction apparatus may estimate the pose as a second shape. The second shape may correspond to a great change in the pose.

In operation 250, the extraction apparatus may determine a target area of the input image from which a feature is to be extracted, and an order that features are extracted from the target area, based on the pose estimated in operation 240.

In an example in which the pose is estimated as the first shape, the extraction apparatus may set a block in a predetermined and/or selected area of the input image, and may extract a feature from a plurality of cells included in the block in a first order. In this example, the predetermined and/or selected area may include locations of the landmarks.

A target area of an input image from which a feature is to be extracted, and an order that features are extracted, will be described with reference to FIG. 5.

In another example in which the pose is estimated as the second shape, the extraction apparatus may set a block in an area corresponding to the predetermined and/or selected area, and may extract a feature from a plurality of cells included in the block in a second order. A target area of an input image from which a feature is to be extracted, and an order that features are extracted, in the example in which the pose is estimated as a second shape will be described with reference to FIG. 7.

In operation 260, the extraction apparatus may extract a feature from the determined target area in the determined order.

Referring to FIG. 2B, the extraction apparatus may detect a face area from the input image in operation 210, and may detect landmarks in the detected face area in operation 220.

In operation 230, the extraction apparatus may calculate angles between the detected landmarks, based on the detected landmark.

In operation 240, the extraction apparatus may estimate a pose of a user, based on the angles calculated in operation 230.

In operation 250, the extraction apparatus may determine a target area of the input image from which a feature is to be extracted, and an order that features are extracted from the target area, based on the pose estimated in operation 240.

In operation 255, the extraction apparatus may normalize the input image. Operation 255 is represented by a dashed line box in FIG. 2B, because operation 255 may be omitted when a size of the input image is small, or when most of a face area of the input image represents a front face, as described above.

In operation 260, the extraction apparatus may extract a feature from the determined target area in the determined order.

FIG. 3 illustrates a difference between feature extraction areas based on a pose of a user according to at least some example embodiment.

FIG. 3 illustrates a process 310 of extracting a feature from an input image 1, and a process 330 of extracting a feature from an input image 2.

The input image 1 representing a front face may be, for example, an image that is slightly changed (that is, an image with a slight change in a pose) due to a normalization process of transforming a face in an input image to a front face. Additionally, the input image 2 in which a face faces a diagonal direction may be, for example, an image that is greatly changed (that is, an image with a great change in a pose) due to the normalization process.

When the input image 1 is received in operation 311, an extraction apparatus may detect a face area from the input image 1 and may detect a plurality of landmarks in the detected face area in operation 313. Similarly, when the input image 2 is received in operation 331, the extraction apparatus may detect a face area from the input image 2 and may detect a plurality of landmarks in the detected face area in operation 333.

The extraction apparatus may normalize a facial image representing the face area, based on the detected landmarks in operations 315 and 335. The extraction apparatus may adjust a size of the facial image, or may transform a facial image with various poses to a front facial image, or a facial image used as a reference image.

The extraction apparatus may extract a feature from the normalized facial image in operations 317 and 337.

In an example, when a center of a nose of a user is set in advance as a center (for example, a first landmark) in the input image 1 with the slight change in the pose, a left side and a right side of the normalized image 1 may be almost symmetrical with each other.

In this example, features may be mostly extracted from the face area, for example, a feature extraction area 319, and a probability that background information other than the face area is extracted may be low.

In another example, when a center of a nose of a user is set in advance as a center in the input image 2 with the great change in the pose, a left side and a right side of the normalized image 2 may not be symmetrical with each other. In this example, features may be highly likely to be extracted from a background area 340, instead of from a face area 338 in a feature extraction area 339. When a feature is extracted from the background area 340, instead of the face area 338, a recognition rate may be reduced.

Figure 4:
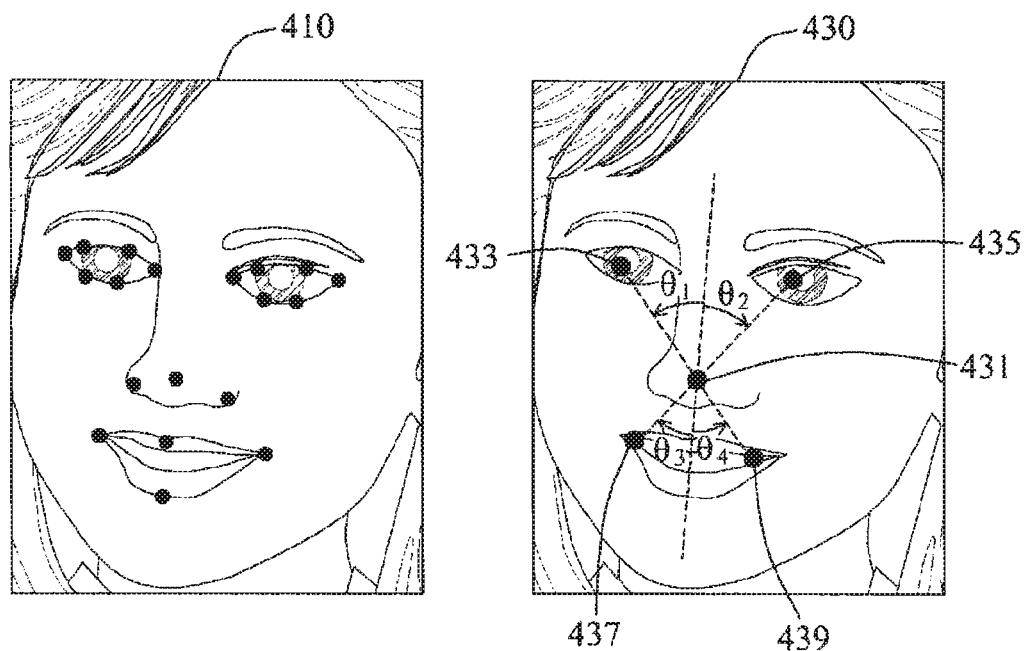
FIG. 4 illustrates an example in which a pose of a user is estimated as a first shape, based on a method of extracting a feature from an input image according to at least one example embodiment.

FIG. 4 illustrates an example in which a pose of a user is estimated as a first shape, based on a method of extracting a feature from an input image according to at least one example embodiment.

Referring to FIG. 4, landmarks may be displayed on a normalized input image 410, and angles between landmarks may be displayed on an image 430.

The landmarks on the normalized input image 410 may be detected from a center of a nose, both eyes, and lips.

The extraction apparatus may calculate an angle between a first landmark 431 and each of landmarks 433, 435, 437 and 439 other than the first landmark 431. The first landmark 431 may be determined in advance in the normalized input image 410, and may correspond to, for example, a center of a nose. The landmarks 433 and 435 may correspond to, for example, centers of both eyes, and the landmarks 437 and 439 may correspond to, for example, mouth corners.

The angle between the first landmark 431 and each of the landmarks 433, 435, 437 and 439 may be displayed on the image 430.

The extraction apparatus may calculate an angle $\theta_1$ between the first landmark 431 and the landmark 433, an angle $\theta_2$ between the first landmark 431 and the landmark 435, an angle $\theta_3$ between the first landmark 431 and the landmark 437, and an angle $\theta_4$ between the first landmark 431 and the landmark 439.

The extraction apparatus may estimate a pose of a user, based on whether each of the calculated angles $\theta_1$ through $\theta_4$ is within a preset and/or selected range.

In FIG. 4, the landmarks 433, 435, 437, and 439 may be almost symmetrical with respect to the first landmark 431 and accordingly, a difference between the calculated angles $\theta_1$ through $\theta_4$ may not be great. Accordingly, each of the calculated angles $\theta_1$ through $\theta_4$ may be within the preset and/or selected range (for example, TL≤θi≤TH in which θi denotes a relative angle between landmarks, i may be a natural number, for example, 1, 2, 3, or 4, and TL and TH denote a minimum threshold and a maximum threshold).

When each of the angles $\theta_1$ through $\theta_4$ is within the preset and/or selected range, for example, when an angle between the center of the nose and each of both eyes and an angle between the center of the nose and each of both mouth corners are within the preset and/or selected range, the extraction apparatus may estimate the pose as a first shape.

An example of a target area from which a feature is to be extracted by the extraction apparatus, and an order that features are extracted, in an example in which a pose of a user is estimated as a first shape, will be described with reference to FIG. 5.

Figure 5:
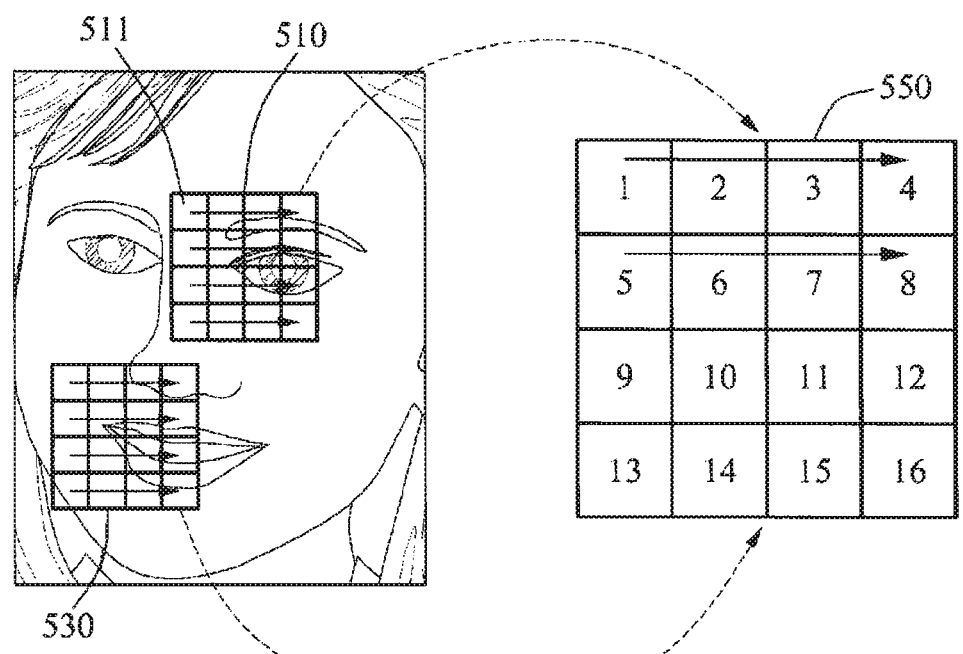
FIG. 5 illustrates a target area of an input image from which a feature is to be extracted, and an order that features are extracted, in an example in which a pose of a user is estimated as a first shape according to at least one example embodiment.

FIG. 5 illustrates a target area of an input image from which a feature is to be extracted, and an order that features are extracted in an example in which a pose of a user is estimated as a first shape according to at least one example embodiment.

Referring to FIG. 5, blocks 510 and 530 may be set in a predetermined and/or selected area of a normalized input image, and a block 550 may include cells on which an order that features are extracted is displayed.

The predetermined and/or selected area in which the blocks 510 and 530 are set may include locations of landmarks in the normalized input image. An angle between the landmarks may be calculated. The block 510 may include a plurality of cells 511.

An angle between landmarks may be within the preset and/or selected range when a pose of a user is slightly changed, as shown in FIG. 4. Accordingly, an extraction apparatus according to at least one example embodiment may extract a feature from each of the cells 511 in a first order, that is, an ascending order from left to right as shown in the block 550. A feature extracted from each of the cells 511 may have a shape of a feature vector of FIG. 8.

Figure 6:
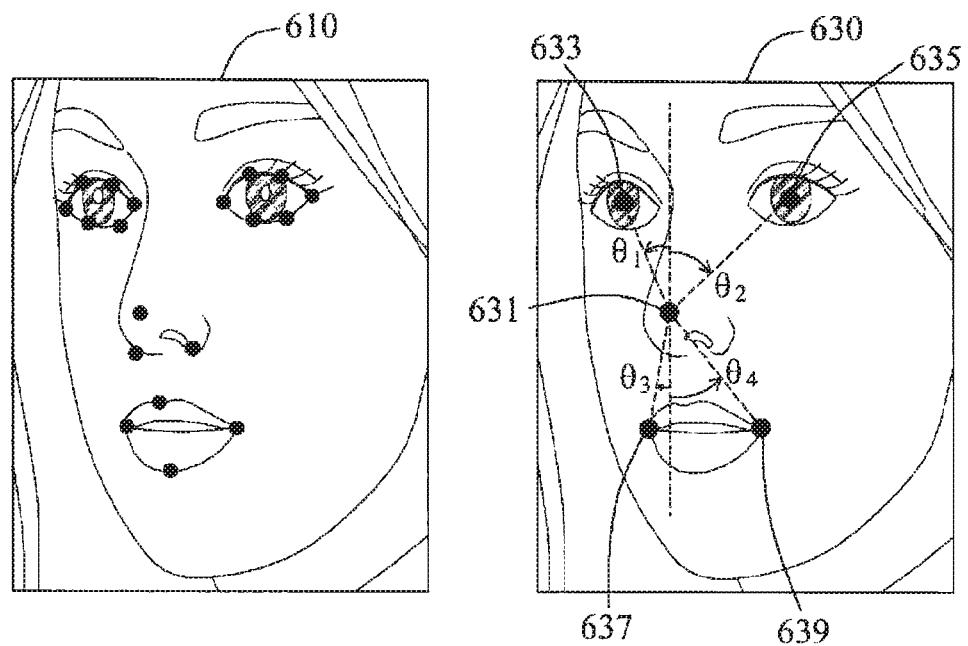
FIG. 6 illustrates an example in which a pose of a user is estimated to partially include a first shape and a second shape, based on a method of extracting a feature from an input image according to at least one example embodiment.

FIG. 6 illustrates an example in which a pose of a user is estimated to partially include a first shape and a second shape, based on a method of extracting a feature from an input image according to at least one example embodiment.

Referring to FIG. 6, landmarks may be displayed on a normalized input image 610, and angles between landmarks may be displayed on an image 630.

The landmarks on the normalized input image 610 may be detected from a center of a nose, outlines of both eyes, mouth corners, a lip portion, and the like.

The extraction apparatus may calculate an angle between a first landmark 631 and each of landmarks 633, 635, 637, and 639 other than the first landmark 631. The first landmark 631 may be determined in advance in the normalized input image 610, and may correspond to, for example, a center of a nose. The landmarks 633 and 635 may correspond to, for example, centers of both eyes, and the landmarks 637 and 639 may be, for example, mouth corners.

The angle between the first landmark 631 and each of the landmarks 633, 635, 637, and 639 may be displayed on the image 630.

The extraction apparatus may calculate an angle $\theta_1$ between the first landmark 631 and the landmark 633, an angle $\theta_2$ between the first landmark 631 and the landmark 635, an angle $\theta_3$ between the first landmark 631 and the landmark 637, and an angle $\theta_4$ between the first landmark 631 and the landmark 639.

The extraction apparatus may estimate a pose of a user, based on whether each of the calculated angles $\theta_1$, $\theta_2$, $\theta_3$, and $\theta_4$ is within the preset and/or selected range.

For example, the angles $\theta_1$ and $\theta_2$ may be assumed to be within the preset and/or selected range (for example, $TL \leq \theta i \leq TH$), and the angles $\theta_3$ and $\theta_4$ may be assumed to be beyond the preset and/or selected range (for example, $\theta i < TL$ or $\theta i > TH$).

In this example, the extraction apparatus may estimate, as a first shape, the pose in a predetermined and/or selected area in which the angles $\theta_1$ and $\theta_2$ are calculated.

Additionally, the extraction apparatus may estimate, as a second shape, the pose in a predetermined and/or selected area in which the angles $\theta_3$ and $\theta_4$ are calculated.

For example, when the angle $\theta_3$ is beyond the preset and/or selected range, the extraction apparatus may extract a feature from an area corresponding to the predetermined and/or selected area in which the angle $\theta_3$ is calculated, instead of from the predetermined and/or selected area, in a reverse order to an order that features are extracted when an angle between landmarks is within the preset and/or selected range. When the pose is greatly changed, the extraction apparatus may extract a feature from a visible opposite area in a facial image and accordingly, it is possible to prevent a feature from being extracted from background information.

In an example embodiment, when an angle between landmarks is beyond a preset and/or selected range, features may be extracted from a portion opposite to a portion including the landmarks in a face area by changing a feature extraction order. Because features may be extracted from a large number of background areas when an angle between landmarks is beyond an appropriate range, extracting of features from an area opposite to an area including the landmarks may be relatively advantageous in user recognition.

An example of a target area from which a feature is to be extracted by the extraction apparatus, and an order that features are extracted, in an example in which a pose of a user is estimated to include a first shape and a second shape will be described with reference to FIG. 7.

Figure 7:
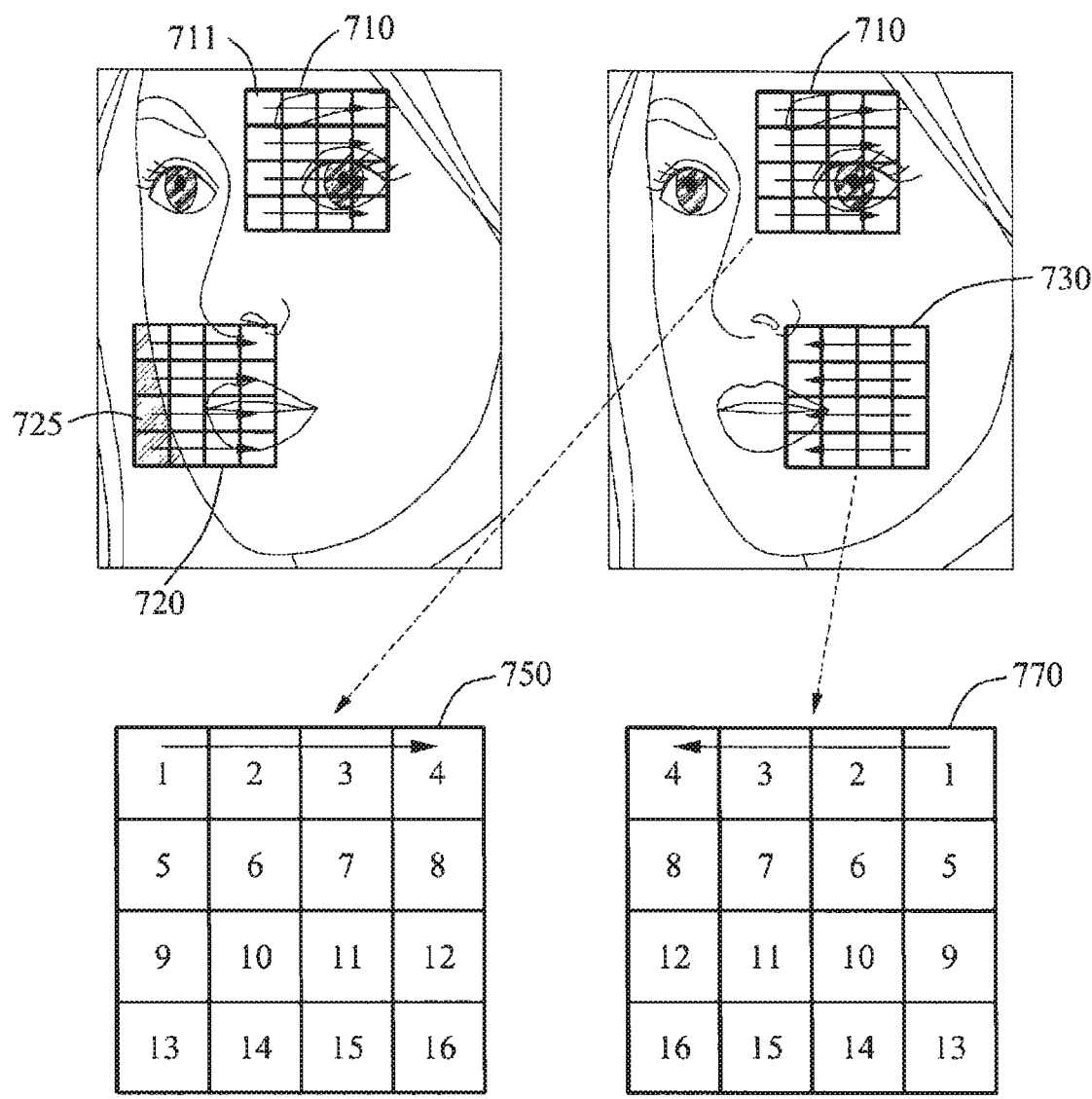
FIG. 7 illustrates a target area of an input image from which a feature is to be extracted, and an order that features are extracted, in an example in which a pose of a user is estimated to include a first shape and a second shape according to at least one example embodiment.

FIG. 7 illustrates a target area of an input image from which a feature is to be extracted, and an order that features are extracted, in an example in which a pose of a user is estimated to include a first shape and a second shape according to at least one example embodiment.

Referring to FIG. 7, blocks 710, 720 and 730 may be set in predetermined and/or selected areas of a normalized input image. Each of blocks 750 and 770 may include cells on which an order that features are extracted is displayed.

An extraction apparatus according to at least one example embodiment may set the blocks 710 and 720 in predetermined and/or selected areas of the normalized input image in which an angle between landmarks is extracted. The block 710 may include a plurality of cells 711, and the block 720 may include a plurality of cells.

Because all angles between landmarks are within a preset and/or selected range in an area in which the pose is estimated as the first shape, as shown in FIG. 6, the extraction apparatus may extract a feature from each of the cells 711 in a first order, that is, an ascending order from left to right as shown in the block 750.

Because angles between landmarks are beyond the preset and/or selected range in an area in which the pose is estimated as the second shape, the extraction apparatus may set a block 730 in an area corresponding to a predetermined and/or selected area (for example, the block 720) including locations of the landmarks.

In the present disclosure, the expression "area corresponding to a predetermined and/or selected area" may be understood to refer to an area opposite to or symmetrical with the predetermined and/or selected area, based on a vertical line drawn vertically through a predetermined and/or selected reference point (for example, a first landmark).

As described above, background information 725 as well as a face may be highly likely to be extracted as features from the area in which the pose is estimated as the second shape. To increase an accuracy of extracting features, features may be extracted from an opposite area that does not include the background information 725. Accordingly, features may be set to be extracted from the block 730, and an order that features are extracted from each of cells in the block 730 may be reverse to that of the block 720.

The extraction apparatus may extract a feature from each of the cells in the block 730 in a second order, that is, an ascending order from right to left as shown in the block 770.

Figure 8:
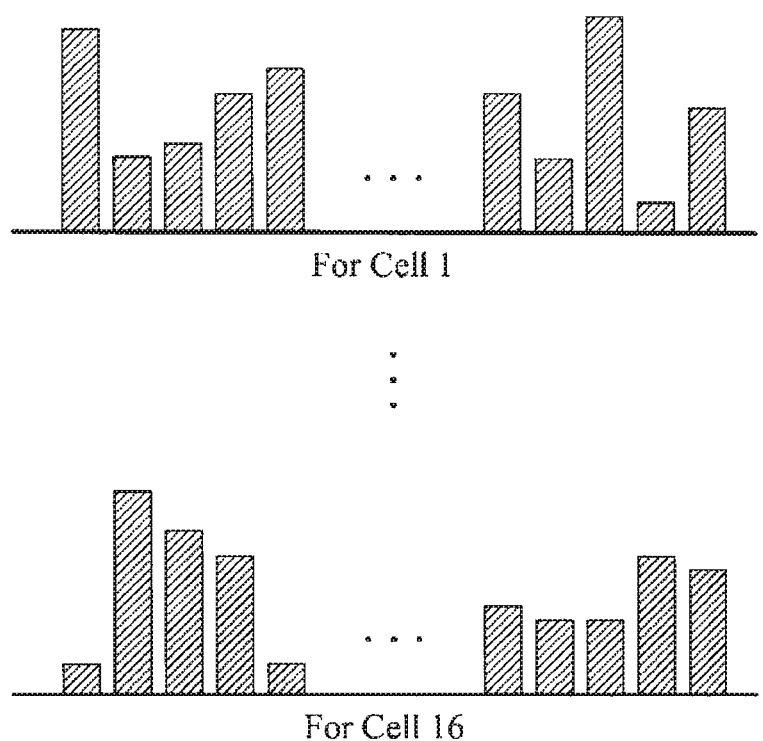
FIG. 8 illustrates a representation form of a feature extracted based on a method of extracting a feature from an input image according to at least one example embodiment.

A feature extracted from each of the cells may have a shape of a feature vector of FIG. 8.

FIG. 8 illustrates a representation form of a feature extracted based on a method of extracting a feature from an input image according to at least one example embodiment.

Referring to FIG. 8, feature vectors may be extracted from each of cells, and may be represented in a graph form.

An extraction apparatus according to at least one example embodiment may perform user recognition or user authorization, based on feature vectors extracted in a predetermined and/or selected order from a target area, for example blocks, from which a feature is to be extracted.

Figure 9:
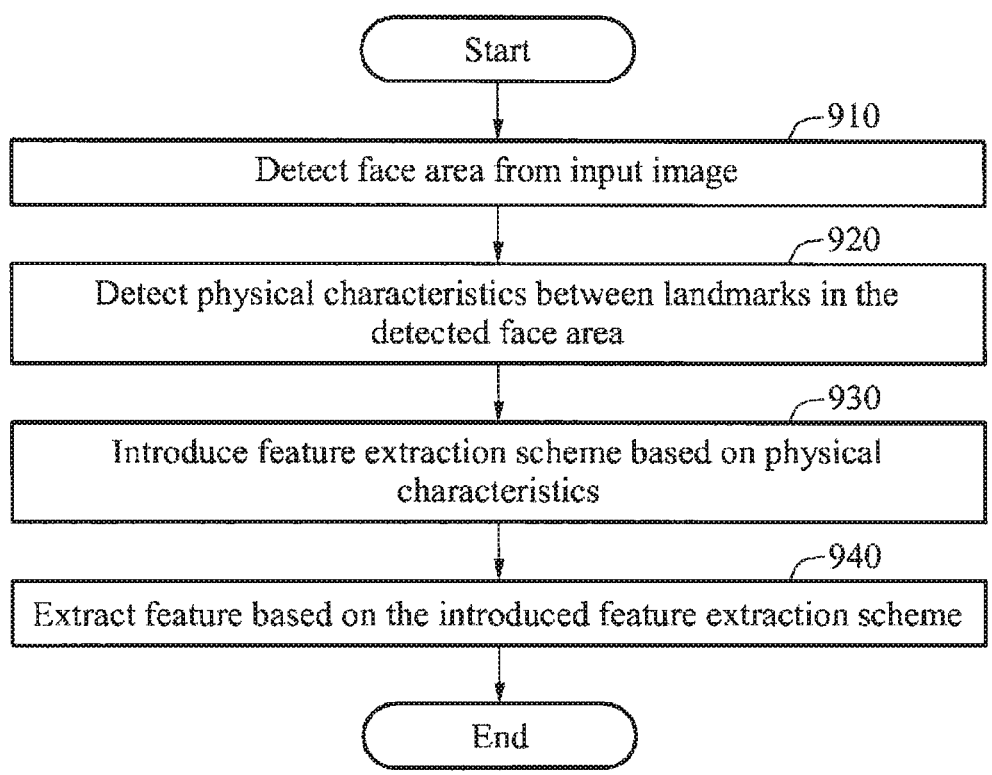
FIG. 9 is a flowchart illustrating another example of a method of extracting a feature from an input image according to at least one example embodiment.

FIG. 9 is a flowchart illustrating another example of a method of extracting a feature from an input image according to at least one example embodiment.

Referring to FIG. 9, an extraction apparatus according to example embodiments may detect a face area from the input image in operation 910, and may detect physical characteristics between landmarks in the detected face area in operation 920. The physical characteristics may include, for example, an angle between a first landmark and each of landmarks other than the first landmark, based on the first landmark. The first landmark may be determined in advance among the landmarks.

The extraction apparatus may calculate an angle between the first landmark and at least one second landmark, and an angle between the first landmark and at least one third landmark, based on the first landmark. For example, the first landmark may be located in a central portion of a nose in a facial image.

In operation 930, the extraction apparatus may introduce a feature extraction scheme, based on the physical characteristics detected in operation 920. The feature extraction scheme may include a target portion of the face area from which a feature is to be extracted, and an order that features are extracted from the target portion.

In operation 930, the extraction apparatus may determine whether a calculated angle between landmarks is within a preset and/or selected range, and may determine either a first scheme or a second scheme as a feature extraction scheme for each of locations of the landmarks, based on a determination result.

The first scheme may refer to a scheme of extracting a feature from a predetermined and/or selected portion of the face area in a first order. The second scheme may refer to a scheme of extracting a feature from a portion corresponding to the predetermined and/or selected portion in a second order.

In an example, when a calculated angle between landmarks is determined to be within a preset and/or selected range, the extraction apparatus may extract a feature from a plurality of cells included in a predetermined and/or selected area, based on the first scheme. The predetermined and/or selected area may include the locations of the landmarks.

In another example, when the calculated angle is determined to be beyond the preset and/or selected range, the extraction apparatus may extract a feature from a plurality of cells included in an area corresponding to the predetermined and/or selected area, based on the second scheme.

In operation 940, the extraction apparatus may extract a feature based on the feature extraction scheme introduced in operation 930.

Figure 10:
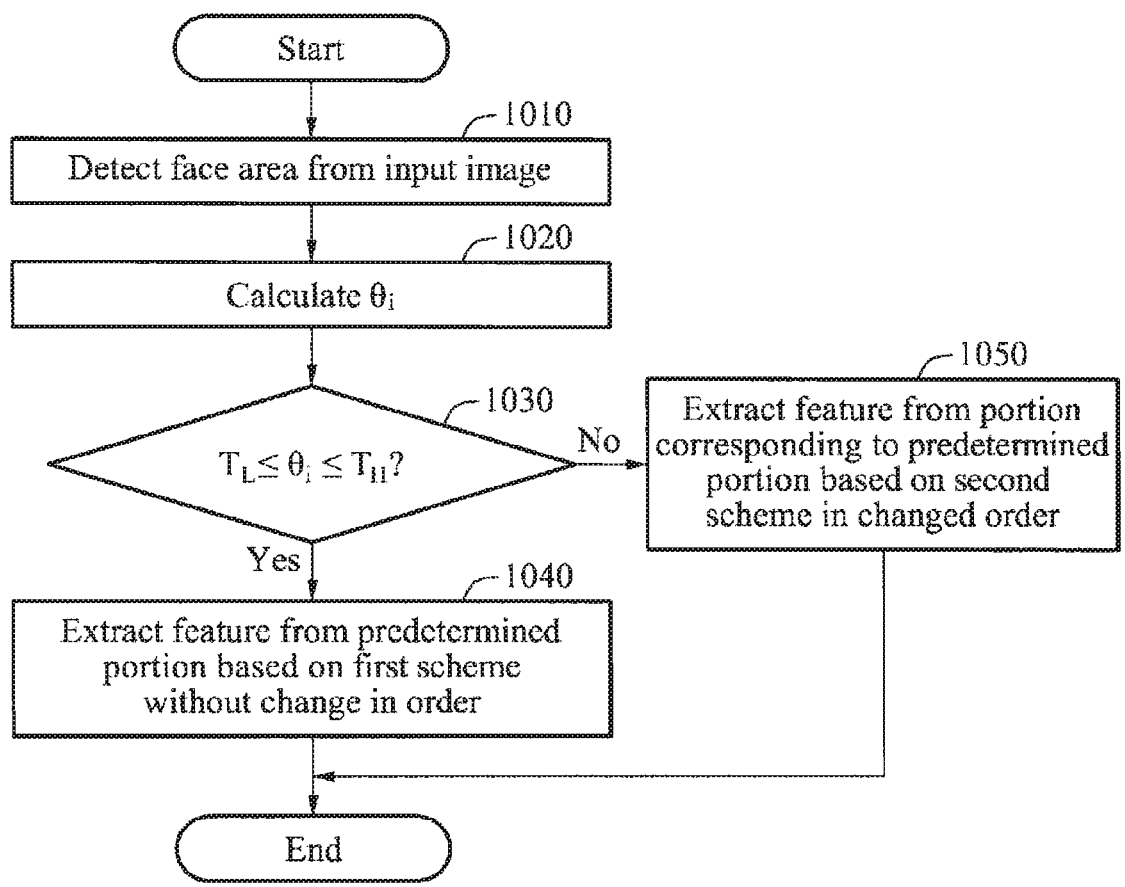
FIG. 10 is a flowchart illustrating still another example of a method of extracting a feature from an input image according to at least one example embodiment.

FIG. 10 is a flowchart illustrating still another example of a method of extracting a feature from an input image according to at least one example embodiment.

Referring to FIG. 10, in operation 1010, the extraction apparatus may detect a face area from the input image.

In operation 1020, the extraction apparatus may calculate a relative angle θi between landmarks in the detected face area. The relative angle θi may refer to an angle between a first landmark determined in advance among the landmarks and each of landmarks other than the first landmark, based on the first landmark.

In operation 1030, the extraction apparatus may determine whether the relative angle θi calculated in operation 1020 is within a preset and/or selected range (for example, TL≤θi≤TH).

When a determination result of operation 1030 indicates that the relative angle θi is within the preset and/or selected range, the extraction apparatus may extract a feature from a predetermined and/or selected portion of the face area, based on a first scheme, instead of changing an order that features are extracted in operation 1040. The predetermined and/or selected portion may include locations of the landmarks.

When the determination result of operation 1030 indicates that the relative angle θi is beyond the preset and/or selected range, the extraction apparatus may change the order that features are extracted, and may extract a feature from a portion corresponding to the predetermined and/or selected portion based on a second scheme in the changed order in operation 1050.

FIG. 11 is a flowchart illustrating a face recognition method according to at least one example embodiment.

Referring to FIG. 11, in operation 1110, the extraction apparatus according to at least one example embodiment may receive an input image.

In operation 1120, the extraction apparatus may detect a face area from the input image received in operation 1110.

In operation 1130, the extraction apparatus may detect landmarks in the face area detected in operation 1120.

In operation 1140, the extraction apparatus may normalize the input image.

In operation 1150, the extraction apparatus may detect physical characteristics between the detected landmarks, based on the detected landmarks in the input image normalized in operation 1140. The physical characteristics may include, for example, an angle between a first landmark and each of landmarks other than the first landmark, based on the first landmark. The first landmark may be determined in advance among the landmarks.

For example, in operation 1150, the extraction apparatus may calculate an angle between the first landmark and at least one second landmark, and an angle between the first landmark and at least one third landmark, based on the first landmark.

In operation 1160, the extraction apparatus may introduce a feature extraction scheme, based on the physical characteristics detected in operation 1150. The feature extraction scheme may include a target area, and an order that features are extracted from the target area. In operation 1160, the extraction apparatus may determine whether a calculated angle between landmarks is within a preset and/or selected range, and may determine a feature extraction scheme based on a determination result.

The extraction apparatus may determine a feature extraction scheme.

For example, the extraction apparatus may determine either a first scheme or a second scheme as a feature extraction scheme for each of locations of the landmarks, based on the determination result. The first scheme may be used to extract the feature from a predetermined and/or selected area of the input image in a first order, and the second scheme may be used to extract the feature from an area corresponding to the predetermined and/or selected area in a second order.

In operation 1170, the extraction apparatus may extract a feature, based on the feature extraction scheme introduced in operation 1160.

In operation 1180, the extraction apparatus may perform face matching, based on the feature extracted in operation 1170.

The units and/or modules (e.g., the extraction apparatus) described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of extracting features from an input image, the method comprising:
   detecting a face area from the input image, the face area including locations of landmarks;
   estimating a pose of a user based on angles between the landmarks;
   determining a target portion of the face area from which the features are to be extracted;
   determining an order of extracting the features from the target portion based on the estimated pose; and
   extracting the features from the target portion in the order, wherein
   the estimating the pose includes,
      estimating the pose as a first shape if a calculated angle of the angles is within a set range, and
   the determining the target portion and the determining the order includes,
      setting a first block in a first portion of the face area if the pose is estimated as the first shape, the first block including a first plurality of cells; and
      extracting the features from the first plurality of cells in a first order.

2. The method of claim 1, wherein
the estimating the pose includes,
estimating the pose as a second shape if the calculated angle is outside the range, and
the determining the target portion and the order includes,
setting a second block in a second portion corresponding to the first portion if the pose is estimated as the second shape, the second block including a second plurality of cells; and
extracting the features from the second plurality of cells in a second order.

* * * * *